United States Patent
Kremers

(10) Patent No.: US 9,862,135 B2
(45) Date of Patent: Jan. 9, 2018

(54) METHOD AND DEVICE FOR MANUFACTURING COMPOSITE PRODUCTS COMPRISING A PLANAR PORTION

(75) Inventor: Marcus Antonius Ivonne Kremers, Amsterdam (NL)

(73) Assignee: Airborne International B.V., 's-Gravenhage (NL)

( * ) Notice: Subject to any disclaimer, the term of this patent is extended or adjusted under 35 U.S.C. 154(b) by 37 days.

(21) Appl. No.: 13/702,552

(22) PCT Filed: Jun. 8, 2011

(86) PCT No.: PCT/NL2011/050413
§ 371 (c)(1),
(2), (4) Date: May 24, 2013

(87) PCT Pub. No.: WO2011/155835
PCT Pub. Date: Dec. 15, 2011

(65) Prior Publication Data
US 2013/0240129 A1 Sep. 19, 2013

(30) Foreign Application Priority Data

Jun. 8, 2010 (NL) .................................. 2004854

(51) Int. Cl.
*B29C 53/60* (2006.01)
*B29C 53/70* (2006.01)
(Continued)

(52) U.S. Cl.
CPC .............. *B29C 53/60* (2013.01); *B29C 53/70* (2013.01); *B29C 53/828* (2013.01); *B29C 69/002* (2013.01); *B29C 53/821* (2013.01)

(58) Field of Classification Search
CPC ................................ B29C 53/60; B29C 53/70
(Continued)

(56) References Cited

U.S. PATENT DOCUMENTS 2,467,999 A  4/1949  Stephens
2,630,157 A  3/1953  Smellie
(Continued)

FOREIGN PATENT DOCUMENTS

CH        350433      11/1960
EP        0154321     9/1985
(Continued)

OTHER PUBLICATIONS

International Search Report from PCT/NL2011/050413 dated Sep. 2, 2011.
(Continued)

*Primary Examiner* — Jeffry H Aftergut
(74) *Attorney, Agent, or Firm* — Swanson & Bratschun, L.L.C.

(57) ABSTRACT

A method of manufacturing a composite profile having a non-circular cross section, comprising the steps of—actuating a string of mandrel sections (1) having a non-circular cross section to move axially in a one way motion through one or more orbital winding stations (3) that are rotationally disposed about to the longitudinal axis of the mandrel in one or more passes, —continuously helically winding in one or more winding stations tape comprising a bundle of parallel longitudinally extending fibers in a thermoplastic matrix material onto the mandrel sections or a previously wound layer to form layers (4) of a wall of a thin walled profile having a closed cross section including at least one planar surface, and—cutting the thin walled profile into profile sections that are carried on one or more mandrel section sections, wherein the layer is consolidated with the previous layer prior to cutting. FIG.1

11 Claims, 1 Drawing Sheet

(51) Int. Cl.
B29C 53/82 (2006.01)
B29C 69/00 (2006.01)

(58) Field of Classification Search
USPC .......................................... 156/432, 425, 172
See application file for complete search history.

(56) References Cited

U.S. PATENT DOCUMENTS

| | | | | |
|---|---|---|---|---|
| 2,731,067 | A * | 1/1956 | Miller | 156/190 |
| 3,148,102 | A | 9/1964 | Eakins | |
| 3,457,962 | A * | 7/1969 | Shobert | A63B 53/10 |
| | | | | 138/125 |
| 3,494,812 | A | 2/1970 | Cvacho | |
| 3,530,901 | A | 9/1970 | Richardson | |
| 3,531,357 | A | 9/1970 | Heckly | |
| 3,567,542 | A * | 3/1971 | Jackson | 156/172 |
| 3,769,127 | A | 10/1973 | Goldsworthy | |
| 4,020,202 | A | 4/1977 | Kreft | |
| 4,058,427 | A | 11/1977 | Wilson | |
| 4,151,031 | A | 4/1979 | Goad | |
| 4,385,952 | A * | 5/1983 | Futakuchi et al. | 156/174 |
| 4,734,146 | A * | 3/1988 | Halcomb et al. | 156/148 |
| 4,790,898 | A | 12/1988 | Woods | |
| 4,867,824 | A * | 9/1989 | Gill et al. | 156/175 |
| 4,877,193 | A | 10/1989 | Vaniglia | |
| 4,891,179 | A | 1/1990 | Peacock | |
| 4,943,334 | A | 7/1990 | Medney | |
| 5,261,991 | A * | 11/1993 | Zackrisson et al. | 156/294 |
| 5,435,868 | A * | 7/1995 | Yu et al. | 156/175 |
| 5,587,041 | A | 12/1996 | Sandusky | |
| 6,047,756 | A * | 4/2000 | Uchida | 156/393 |
| 6,782,932 | B1 | 8/2004 | Reynolds | |
| 7,238,250 | B2 * | 7/2007 | Kindervater | 156/192 |
| 2001/0039700 | A1 | 11/2001 | Krueger | |
| 2002/0119271 | A1 | 8/2002 | Quigley | |
| 2003/0209312 | A1 * | 11/2003 | Hauber | 156/172 |
| 2005/0258575 | A1 | 11/2005 | Kruse | |
| 2007/0175573 | A1 | 8/2007 | Fox | |
| 2009/0250134 | A1 | 10/2009 | Slagsvold | |
| 2010/0062249 | A1 | 3/2010 | Harazono | |

FOREIGN PATENT DOCUMENTS

| | | |
|---|---|---|
| EP | 0198744 | 10/1986 |
| EP | 0265915 | 5/1988 |
| EP | 0355308 | 2/1990 |
| EP | 0423954 | 4/1991 |
| EP | 0463611 A2 * | 1/1992 |
| EP | 0535264 | 4/1993 |
| EP | 1118450 | 7/2001 |
| FR | 2389060 | 11/1987 |
| GB | 1291729 | 10/1972 |
| GB | 1485586 A * | 1/1976 |
| JP | U56066423 | 4/1981 |
| JP | A57069023 | 4/1982 |
| JP | A61002540 | 1/1986 |
| JP | 63-167184 A * | 7/1988 |
| JP | A05031810 | 2/1993 |
| JP | A11111893 | 4/1999 |
| WO | WO 98/03326 | 1/1998 |
| WO | PCT-98/38030 A1 * | 9/1998 |
| WO | WO 98/38030 | 9/1998 |
| WO | WO 2004/007179 | 1/2004 |
| WO | WO 2005/108046 | 11/2005 |
| WO | WO 2006/107196 | 10/2006 |

OTHER PUBLICATIONS

International Preliminary Report on Patentability dated Sep. 12, 2013 from International Application No. PCT/NL2012/050133.
International Preliminary Report on Patentability dated May 13, 2013 from International Application No. PCT/NL2012/050134.
Office Action from U.S. Appl. No. 14/002,944 dated Nov. 10, 2015.
Office Action from U.S. Appl. No. 14/002,937 dated Nov. 4, 2015.
English translation of Office Action from JP Application 2013-514132 dated Mar. 16, 2015.
Office Action from U.S. Appl. No. 14/002,937 dated Sep. 29, 2016.
International Search Report from PCT/NL2006/000177 dated Aug. 22, 2006.
Office Action from U.S. Appl. No. 14/002,944 dated May 31, 2016.
Office Action from U.S. Appl. No. 14/002,944 dated Feb. 8, 2017.

* cited by examiner

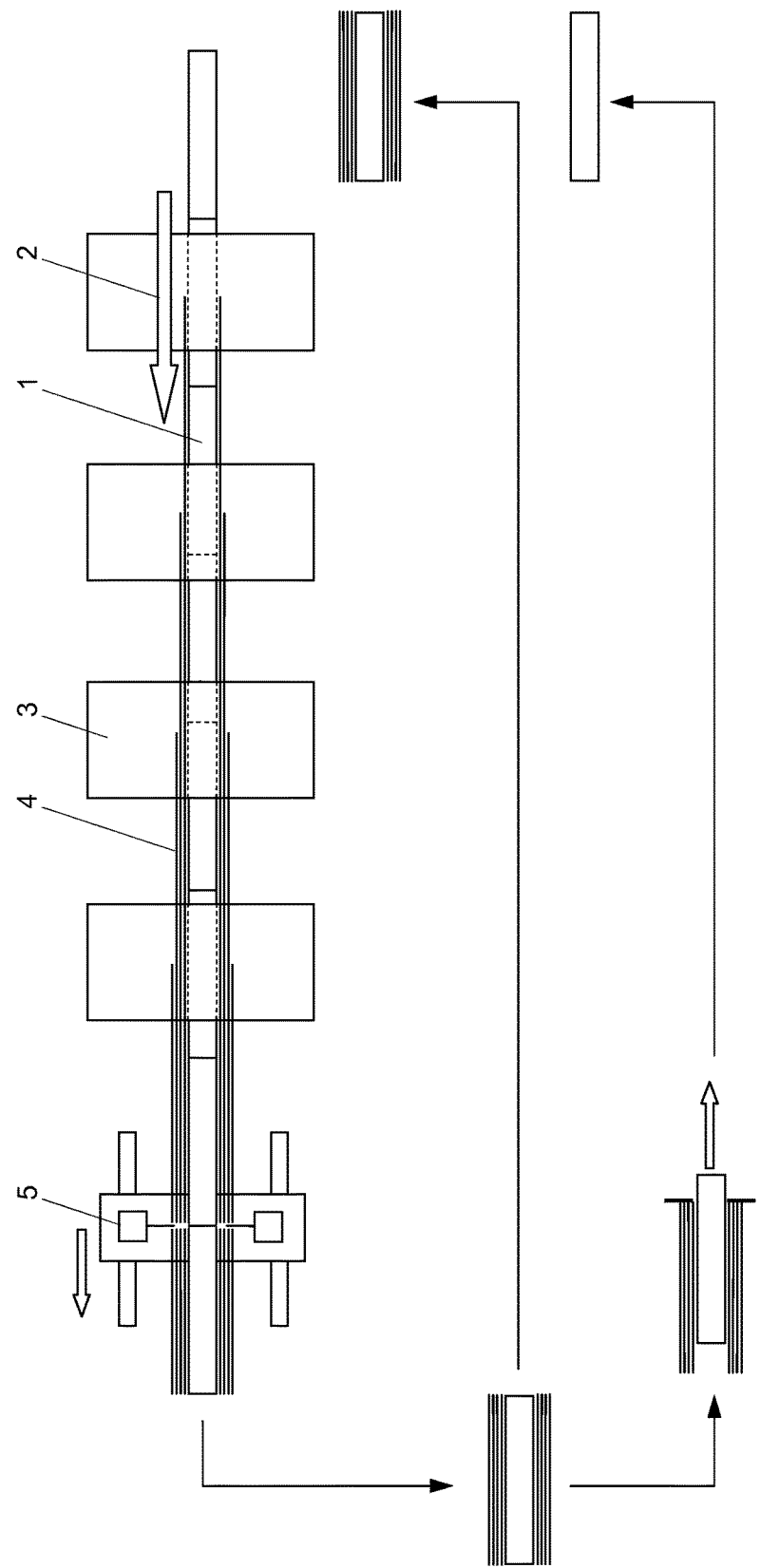

METHOD AND DEVICE FOR MANUFACTURING COMPOSITE PRODUCTS COMPRISING A PLANAR PORTION

RELATED APPLICATIONS

This application is a 35 U.S.C. §371 national phase application of PCT/NL2011/050413(WO 2011/155835), filed on Jun. 8, 2011, entitled "Method and Device for Manufacturing Composite Products Comprising a Planar Portion", which application claims the benefit of Netherlands Application No. 2004854, filed Jun. 8, 2010, which is incorporated herein by reference in its entirety.

The invention relates to a method and a device for manufacturing composite products, in particular profiles, comprising a planar portion in a continuous process.

Due to their high strength to weight ratio, composite products comprising reinforcement fibres embedded in a matrix material have become popular. For products comprising a planar portion, in particular flat composite panels, traditionally a number of superimposed layers of woven fibre material, such as glass or carbon fibre mats, embedded in a thermoset resin or thermoplastic matrix material have been used. However, the interwoven structure of the fibres limits the compactness and flatness of planar portions of such products. Thereto, it has been proposed to build up products comprising a planar portion from superimposed layers that themselves are built up from parallel, adjacent stretches of tapes including a bundle of unidirectional fibres embedded in a thermoplastic matrix material (UD-tape), the tapes in adjacent layers extending in different directions. As each layer is built up of unidirectionally, parallel extending fibres that are not interwoven, compared to a product built up of layers with interwoven fibres, the layers can be stacked more densely, and the stack can be more flat to be compact and flat. Further, the strength and/or the stiffness of the products may increase. In addition, a step of interweaving fibre structure is eliminated, thereby reducing manufacturing costs.

Such thermoplastic tapes with unidirectional fibres may be placed and consolidated by applying heat and pressure as they are laid in a mould with a so called Advanced Fibre Placement process using e.g. a fibre placement head mounted on a robot arm. Alternatively the tapes may be laid and spot welded to form a green unconsolidated product, for example by applying a Fibre Forge process or using a normal type pick and place unit, which product can be consolidated under elevated temperature and pressure in a mould, for example in a heated press, heated mould, oven or autoclave. A disadvantage of these known processes is that they are fairly costly. In particular, the production speeds are relatively slow because of the stop- and start-process at the edge of the product, which is a discontinuous process. Further, the tapes may cause the edges of the product to be frayed, which results in scrap material.

The invention aims to alleviate these disadvantages. Thereto the invention proposes a method and an apparatus to manufacture a composite profile having a non-circular cross section in a continuous process in which a string of mandrel sections having a non-circular cross section is actuated to move axially in a one way motion through one or more orbital winding stations that are rotationally disposed about to the longitudinal axis of the mandrel in one or more passes, and in which one or more winding stations tape, comprising a bundle of parallel longitudinally extending fibres in a thermoplastic matrix material, is helically wound onto the mandrel sections or a layer previously wound thereon to form layers of a wall of a thin walled profile having a closed, non-circular cross section.

This way, tapes may be laid continuously, and time to start and stop laying the tape may be saved. Also, as the profile is wound as a continuous profile, edge losses can be reduced.

When passing is finished, the profile may be cut transversely and/or longitudinally to form a composite product. The non-circular cross section of the mandrels allows the longitudinal sections of the cut profile to be combined into non-circular related shapes. The cross section of the mandrel sections is preferably closed to support the layers. The cross section of the mandrel may e.g. be oval, a triangular, square, rectangular or polygonal. The cross section of the mandrel sections preferably includes a straight portion, so that the profile section formed on the mandrel section includes a planar portion, which after longitudinal cutting of the profile section may form a flat blank. For example, a string of mandrel sections having a square cross section may be used to make a thin walled fibre reinforced beam having a wall thickness of e.g. 0,5 cm, and a cross section of 30×30 cm, which may be cut into planar products of 0,5×30×200 cm. A profile having a square of rectangular cross section may alternatively be cut into product having an L- or C-shaped cross section. The products may be forged together to e.g. form a stiffened plate or an I beam, or may be used as tailored blanks. It is noted that, in the process of forming a product, un-cut profiles, i.e. closed profiles, can be used, as an alternative to using profiles that have been cut along a longitudinal direction.

Unless specified otherwise, a cross section as used in this application is meant to be a cross section perpendicular to the longitudinal axis, and is meant to be constant in shape and size along the longitudinal axis.

The tapes may be heated and pressed onto the mandrel sections or the previous layer as they are laid A suitable winding apparatus is e.g. disclosed in WO2006/107196.

In order to withstand the heat and pressure that is applied to consolidate the layers of tape, the mandrel sections are preferably made from steel or a similar heat and pressure resistant material. The section may be separated from the wound profile section after its final pass, e.g. after it has been cut to length.

The string of mandrel sections may comprise a string of axially aligned, abutting mandrel sections. The layers wound in a pass are, at the location of a break between abutting sections, cut using a cutter, and the mandrel sections may be looped back to be passed through the winding stations again. The string of mandrel sections is preferably pushed through the winding station(s). The mandrel sections in the string may interlock, and may at the location of a break be provided with a recess to accommodate a cutter. The cutter may be arranged downstream of the winding stations. Preferably, the cutter is arranged to travel with the moving section while cutting.

The tapes may thus be consolidated to the previous layer before the profile is sectioned. Consolidation may be achieved by applying heat and pressure, e.g. using heated rollers. This way, the tapes and previous layers are fixed together, so that a solid section is formed. By consolidating the layer before sectioning, the sectioned profiles may be handled without loss of integrity. Further, a secondary curing or consolidation step may be avoided. In addition, the risk of air entrapment (voids) may be reduced.

For example, the profile with the newly laid layer may be cut into a section and handled without losing tension in the newly added layer. In addition, the section may be handled when only a few layers are placed, without the risk of slipping of the tapes or buckling of the fibres due to compressive loads. This facilitates separating the profile sections from the continuous profile after they have passed through the line of winding stations. They may easily be transported to the beginning of the line, of winding stations where the mandrel section may be connected to a string of mandrel sections and feed the half-finished product for the next pass into the production line.

Preferably, subsequent winding stations provide helically wound layers of positive and negative orientation.

Consolidation while laying the tape also allows additional tapes to be placed and fixated only locally, and not over the whole circumference of the profile. For example, tapes can be placed in the longitudinal direction on only a part of the circumference, in addition to the continuously wound layers. Or if the winding station is equipped with an automated cut- and restart system, additional helical layers can be placed on only a part of the longitudinal length. Additional stations may be provided in which layers of tape are provided that extend parallel or perpendicular to the axis of the profile.

The number of layers in the wall of the profile and/or the orientation of the fibres may be chosen to vary along the length of the profile, e.g. to provide local reinforcements.

The mandrel sections may have varying cross-section, and can e.g. be tapered.

The invention shall be explained further using a non-limiting example that is shown in the schematic drawing of FIG. 1.

FIG. 1 shows a method of manufacturing a composite profile comprising a planar portion. A string of steel mandrel sections 1 having a closed, rectangular cross section with four straight edges is pushed axially at arrow 2 to move in a one way motion through a number of winding stations 3 in one or more passes. The winding stations 3 are orbital winding stations, i.e. winding stations that are rotationally disposed about to the longitudinal axis of the mandrel. The winding stations are arranged to continuously helically wind tape comprising a bundle of parallel longitudinally extending fibres in a thermoplastic matrix material onto the circumference of the mandrel section or a previously wound layer to form layers 4 of a wall of a thin walled profile having a rectangular cross section presenting four planar surfaces. The helical winding is continuous in that it need not reverse, and thus need not stop to reverse. The layers 4 are consolidated while they are laid in the station, e.g. by using heated pressure rollers. The wound layers 4 are sectioned at the location of the abutment of the mandrel sections using a translating cutter 5 that travels with the string of mandrel sections. This way, profile sections are formed that are carried on mandrel sections. The mandrel sections with the wound layers are fed back to be passed through the stations until the profile has reached the desired wall thickness. Then the mandrel sections 1 are removed from the profile sections, and the profiles are cut longitudinally into four flat, longitudinal blanks (not shown). The mandrel section may be fed back to pass though the winding stations again.

The invention is not limited to the exemplary embodiment described herein. For example, the thermoplastic UD tapes may be so called dry performs including a thermoplastic binding material. In addition to helically wound layers, additional layers of tape may be provided locally. For example, local layers may be provided that that extend longitudinally to the axis of the profile, e.g. an additional layer in the top- and bottom face of a profile having a square cross section. Such layers may or may not extend continuously. Further, additional circumferential layers may be wound without pitch, and additional helical windings may be provided that extend along part of the length of the profile only. Also, the sectioned profile may include one or more mandrel sections, and the location of the transverse cut may not need necessarily be at the abutment of the mandrel sections. Further, subsequent mandrel sections need not be identical, and may e.g. have different cross sections if desired. Many variations and alternatives shall be clear to the skilled person, and are to be considered within the scope of the invention as defined in the appended claims.

The invention claimed is:

1. A method of manufacturing a composite profile having a non-circular cross section, comprising the steps of
actuating a string of mandrel sections, each having a closed non-circular cross section providing at least one planar portion on each mandrel section, to move axially in a one way motion through one or more orbital winding stations that are rotationally disposed about to the longitudinal axis of the mandrel in one or more passes,
continuously helically winding in one or more winding stations thermoplastic unidirectional tape (UD tape) comprising a bundle of parallel longitudinally extending fibres in a thermoplastic matrix material onto the mandrel sections or a previously wound layer with the parallel longitudinally extending fibers of the UD tape of a particular helically wound layer lying at a single helical angle relative to the longitudinal axis of the mandrel to form at least two layers of a wall of a thin walled profile having a closed cross section including at least one planar surface,
heating and pressing the thermoplastic unidirectional tape (UD tape) onto the entire radial surface of the mandrel sections, including the at least one planar portion, or a previous layer of tape on the radial surface of the mandrel sections, before a subsequent tape is laid, and
cutting the thin walled profile into profile sections that are carried on one or more mandrel sections,
wherein each layer of the thermoplastic unidirectional tape (UD tape) is consolidated with a previous layer in the heating and pressing step prior to cutting so that after cutting the profile sections can be handled without loss of integrity; and
re-passing each cut profile section carried on one or more mandrel sections with at least one wound layer thereon through the one or more winding stations at least once followed by the heating and pressing step and the cutting step.

2. The method of claim 1, wherein the profile section is cut longitudinally.

3. The method of claim 1 further comprising re-passing each cut profile section carried on the one or more mandrel sections with at least on wound layer thereon through the one or more winding stations until the profile section reaches a desired wall thickness.

4. A method of manufacturing a composite profile having a non-circular cross section, comprising the steps of
actuating a string of mandrel sections having a non-circular cross section to move axially in a one way motion through one or more orbital winding stations that are rotationally disposed about to the longitudinal axis of the mandrel in one or more passes,
continuously helically winding in one or more winding stations thermoplastic unidirectional tape (UD tape) comprising a bundle of parallel longitudinally extending fibers in a thermoplastic matrix material onto the mandrel sections or a previously wound layer with the parallel longitudinally extending fibers of the UD tape of a particular helically wound layer lying at a single helical angle relative to the longitudinal axis of the mandrel to form at least two layers of a wall of a thin walled profile having a closed cross section including at least one planar surface, and cutting the thin walled profile into profile sections that are carried on one or more mandrel sections, wherein the thermoplastic unidirectional tape (UD tape) is heated and pressed onto the mandrel sections or a previously wound layer before a subsequent layer of UD tape is laid, so that a layer is consolidated with a previously wound layer prior to application of a subsequent layer wherein each layer of the thermoplastic unidirectional tape (UD tape) is consolidated with a previous layer by the heating and pressing prior to cutting so that after cutting the profile sections can be handled without loss of integrity; and re-passing each cut profile section carried on one or more mandrel sections with at least one wound layer thereon through the one or more winding stations at least once.

5. The method of claim 4, wherein the profile section is cut longitudinally.

6. The method of claim 4, wherein the cross section of the mandrel sections includes a straight portion, so that the profile sections include a planar surface.

7. The method of claim 4 further comprising re-passing each cut profile section carried on the one or more mandrel sections with at least on wound layer thereon through the one or more winding stations until the profile section reaches a desired wall thickness.

8. A device for manufacturing a composite profile having a non-circular cross section, comprising:

a string of mandrel sections having a non-circular cross section that is arranged to move axially in a one way motion through one or more orbital winding stations that are rotationally disposed about to the longitudinal axis of the string of mandrel sections in one or more passes, the one or more orbital winding stations being arranged to continuously helically wind thermoplastic unidirectional tape (UD tape) comprising a bundle of parallel longitudinally extending fibers in a thermoplastic matrix material onto the mandrel sections or a previously wound layer to form layers of a wall of a thin walled profile having a closed, non-circular cross section with the parallel longitudinally extending fibers of a particular helically wound layer of the UD tape lying in a single helical angle relative to the longitudinal axis of the mandrel and to heat the thermoplastic unidirectional tape (UD tape) and press it onto the mandrel sections or a previous layer as it is laid, so that each orbital winding station is arranged to consolidate a layer onto a previously wound layer, wherein each layer of the thermoplastic unidirectional tape (UD tape) is consolidated with a previous layer by the heating and pressing prior to cutting so that after cutting the profile sections can be handled without loss of integrity; and a cutter, downstream from the winding stations, to cut the profile into profile sections that are carried on one or more mandrel sections, wherein the string of mandrel sections is configured so that each cut profile section carried on one or more mandrel sections with at least one wound layer thereon is returned to the string of mandrel sections to pass through the one or more winding stations at least once.

9. The device of claim 8, wherein the non-circular cross section of the mandrel sections includes a straight portion so that the profile section includes at least one planar surface.

10. A device for manufacturing a composite profile having a non-circular cross section, comprising:

a string of mandrel sections having a non-circular cross section that is arranged to move axially in a one way motion through one or more orbital winding stations that are rotationally disposed about to the longitudinal axis of the string of mandrel sections in one or more passes, the one or more orbital winding stations being arranged to continuously helically wind thermoplastic unidirectional tape (UD tape) comprising a bundle of parallel longitudinally extending fibers in a thermoplastic matrix material onto the mandrel sections or a previously wound layer to form layers of a wall of a thin walled profile having a closed, non-circular cross section with the parallel longitudinally extending fibers of the UD tape of a particular helically wound layer lying in a single helical angle relative to the longitudinal axis of the mandrel, and to heat the thermoplastic unidirectional tape (UD tape) and press it onto the mandrel sections or a previous layer prior to application of a subsequent layer, so that each orbital winding stations is arranged to consolidate a layer onto a previously wound layer before application of a subsequent layer, wherein each layer of the thermoplastic unidirectional tape (UD tape) is consolidated with a previous layer by the heating and pressing prior to cutting so that after cutting the profile sections can be handled without loss of integrity, and a cutter, downstream from the winding stations, to cut the profile into profile sections that are carried on one or more mandrel sections, wherein the string of mandrel sections is configured so that each cut profile section carried on one or more mandrel sections with at least one wound layer thereon is returned to the string of mandrel sections to pass through the one or more winding stations at least once.

11. The device of claim 10, wherein the non-circular cross section of the mandrel sections includes a straight portion so that the profile section includes at least one planar surface.

* * * * *